United States Patent
Goeppert

(10) Patent No.: US 9,909,663 B2
(45) Date of Patent: Mar. 6, 2018

(54) METHOD FOR CONTROLLING A TRANSMISSION

(71) Applicant: Schaeffler Technologies AG & Co. KG, Herzogenaurach (DE)

(72) Inventor: Georg Goeppert, Hausach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 318 days.

(21) Appl. No.: 14/758,014

(22) PCT Filed: Jan. 24, 2014

(86) PCT No.: PCT/DE2014/200026
§ 371 (c)(1),
(2) Date: Jun. 26, 2015

(87) PCT Pub. No.: WO2014/121793
PCT Pub. Date: Aug. 14, 2014

(65) Prior Publication Data
US 2015/0345624 A1     Dec. 3, 2015

(30) Foreign Application Priority Data

Feb. 11, 2013   (DE) ........................ 10 2013 202 159

(51) Int. Cl.
*F16H 57/00*   (2012.01)
*F16H 61/04*   (2006.01)
*F16H 61/688*  (2006.01)

(52) U.S. Cl.
CPC ..... *F16H 61/0437* (2013.01); *F16H 57/0006* (2013.01); *F16H 61/688* (2013.01); *F16H 2057/0012* (2013.01); *F16H 2061/0462* (2013.01)

(58) Field of Classification Search
None
See application file for complete search history.

(56) References Cited

U.S. PATENT DOCUMENTS

| | | | |
|---|---|---|---|
| 2012/0290167 A1* | 11/2012 | Mordukhovich | F16H 61/12 701/29.5 |
| 2013/0035201 A1* | 2/2013 | Falkenstein | B60W 10/02 477/5 |
| 2013/0109532 A1* | 5/2013 | Griffin | B60W 10/02 477/79 |

FOREIGN PATENT DOCUMENTS

| | | |
|---|---|---|
| DE | 10308713 | 10/2003 |
| DE | 102006008207 | 9/2006 |
| DE | 102006010934 | 9/2006 |
| DE | 102008032757 | 1/2010 |

* cited by examiner

*Primary Examiner* — Edwin A Young
(74) *Attorney, Agent, or Firm* — Simpson & Simpson, PLLC

(57) ABSTRACT

A method for controlling a transmission to reduce or suppress vibrations of transmission elements and/or rattling sounds, in particular in dual-clutch transmissions having a first transmission line with a first clutch and having a second transmission line with a second clutch. Transmission ratios are assigned to the transmission lines so that torque is transmissible between an input shaft and an output shaft of the transmission via a selected transmission line with a transmission ratio selected. The clutch of the selected transmission line is operated with slippage in predetermined operating situations to transmit torque.

15 Claims, 2 Drawing Sheets

METHOD FOR CONTROLLING A TRANSMISSION

CROSS-REFERENCE TO RELATED APPLICATIONS

The present application is the U.S. national stage application pursuant to 35 U.S.C. §_371 of International Application No. PCT/DE2014/200026, filed Jan. 24, 2014, which application claims priority of German Application No. 10 2013 202 159.3 filed Feb. 11, 2013.

TECHNICAL FIELD

The invention relates to a method for controlling a transmission to reduce or suppress vibrations of transmission elements and/or rattling sounds.

BACKGROUND

Torsional vibrations occur in motor vehicles having an internal combustion engine, in particular at low engine speeds, which cannot always be damped adequately by a dual-mass flywheel situated in the drivetrain.

In dual clutch transmissions, as a rule two transmission lines are available within the transmission. Each transmission line can be activated by means of a respective clutch to transmit torque when the relevant clutch assigned to the transmission line is engaged, in order to be able to transmit an intended torque when a gear ratio is selected. The clutch of the other, inactive transmission line remains disengaged in this case. A gear ratio may be selected in the inactive transmission line, however, in order to be able to achieve a faster transmission ratio change by means of gear preselection.

Torsional vibrations occur, in particular, in three-cylinder engines at low speeds of rotation. In dual-clutch transmissions, resulting in vibrations in the free play of the coupled but inactive transmission line or the inactive input shaft, because the angles of oscillation of the secondary mass of the dual-mass flywheel are still too large.

It would of course be possible to avoid vibration by pre-selecting neutral for the inactive transmission line and the inactive input shaft. However, this results in increased shifting times when changing the transmission ratio, because the subsequent gear ratio still has to be selected first, which is very disruptive, in particular at low speeds of rotation. The preceding arrangement is also very disadvantageous, because the driving conditions in question occur especially frequently in city traffic.

Rattling sounds in the drivetrain are eliminated in the existing art according to DE 10 2006 008 207 A1 by engaging the clutch of the passive transmission line in such a way that slippage develops at the clutch, so that the passive transmission line comes under load and slight tension and the parts of the transmission line bear against each other due to the tensioning, so that even if there are vibrations little or no rattling can be heard.

However, the above method has the disadvantage that the continuously slipping application of the clutch results in substantial wear to the clutch, and also in unacceptably high increased fuel consumption.

The object of the invention is therefore to create a method for controlling a transmission which achieves a reduction or suppression of vibrations of transmission elements and/or rattling sounds, and yet causes little wear and only slight but acceptable increased fuel consumption.

SUMMARY

An exemplary embodiment of the inventions provides for a method for controlling a transmission to reduce or suppress vibrations of transmission elements and/or rattling sounds, in particular, a dual-clutch transmission having a first transmission line with a first clutch and a second transmission line with a second clutch. Gear ratios are assigned to the transmission lines so that torque is transmissible between an input shaft and an output shaft of the transmission via a selected transmission line with a gear ratio selected. The clutch of the selected transmission line is operated with slippage in predetermined operating situations to transmit torque. As a result, in predetermined operating situations in which the isolation or damping of torsional vibrations by the provided torsional vibration damper, such as a dual-mass flywheel, is not adequate, slippage is actuated, temporarily or depending on operating conditions, in the clutch that is assigned to the selected transmission line. This results in improved damping and isolation, but in operating situations in which the vibration damping of the torsional vibration damper is adequate, no slippage is actuated. Thus, improved vibration damping is achieved without great modification of the torsional vibration damper and without suppressing specific operating situations, while the increase in fuel consumption due to the slippage is slight.

In an example embodiment, it is advantageous if the predetermined operating situation is an operating situation at engine speeds lower than 1,800 revolutions per minute (rpm), for example, lower than 1,500 rpm or lower than 1,300 rpm. In an example embodiment, it is advantageous if the gear ratio activated in the selected transmission line is a gear ratio for low speeds up to about 30 to 50 km/h. The result is that good vibration isolation is achieved, in particular in city traffic at low driving speeds.

In an example embodiment, the clutch of the non-selected transmission line is engaged, at least for a limited time, in such a way that it is operated with slippage. This enables a clamping to be achieved in predetermined operating situations, which then suppresses rattling of the elements of the transmission line. Alternatively, the clutch of the non-selected transmission line remains disengaged.

In this case, it is also advantageous if a transmission ratio is set in the non-selected transmission line. This enables a clamping to be achieved with the clutch slippage.

In an example embodiment, the clutch of the non-selected transmission line is operated for a limited time with slippage only in critical operating situations of the transmission. By critical operating situation, it is meant an operating situation in which vibrations of transmission elements and/or rattling sounds are at their highest. This can be actuated with the clutch of the selected transmission line slipping, or with the clutch of the selected transmission line engaged.

In an example embodiment, it is also advantageous if a detection of a predetermined operating system is carried out, so that the selected clutch and/or the non-selected clutch are actuated with slippage to reduce vibration and/or to reduce rattling noise.

In an example embodiment, it is advantageous if a detection of a future predetermined operating situation is carried out in order to actuate the selected clutch with slippage before the vibrations perceived as disturbing have developed. This enables the slipping operation to be actuated in anticipation, before the torsional vibrations occur and are perceptible.

In an example embodiment, it is also advantageous if the slipping actuation of the clutch is ended or prevented when the predetermined operating situation is not present. This enables the slipping to be limited, so that the accompanying increased fuel consumption is likewise limited.

In an example embodiment, the slippage is in the range from about 10 to 100 rpm, for example, in the range between 25 and 50 rpm. This achieves adequate vibration isolation.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1 is a schematic depiction of a drivetrain of a motor vehicle, having drive motor 1, dual-mass flywheel 2 with two inertial masses 3, 4 as primary and secondary inertial masses, torsional vibration damper 5 and clutch 6 in transmission line 7 of a transmission 8. Clutch 6 in this case is, for example, a clutch having a clutch plate between two pressure plates or between the pressure plate and secondary inertial mass 4. Drive motor 1 may be, for example, an internal combustion engine.

Figure 1:
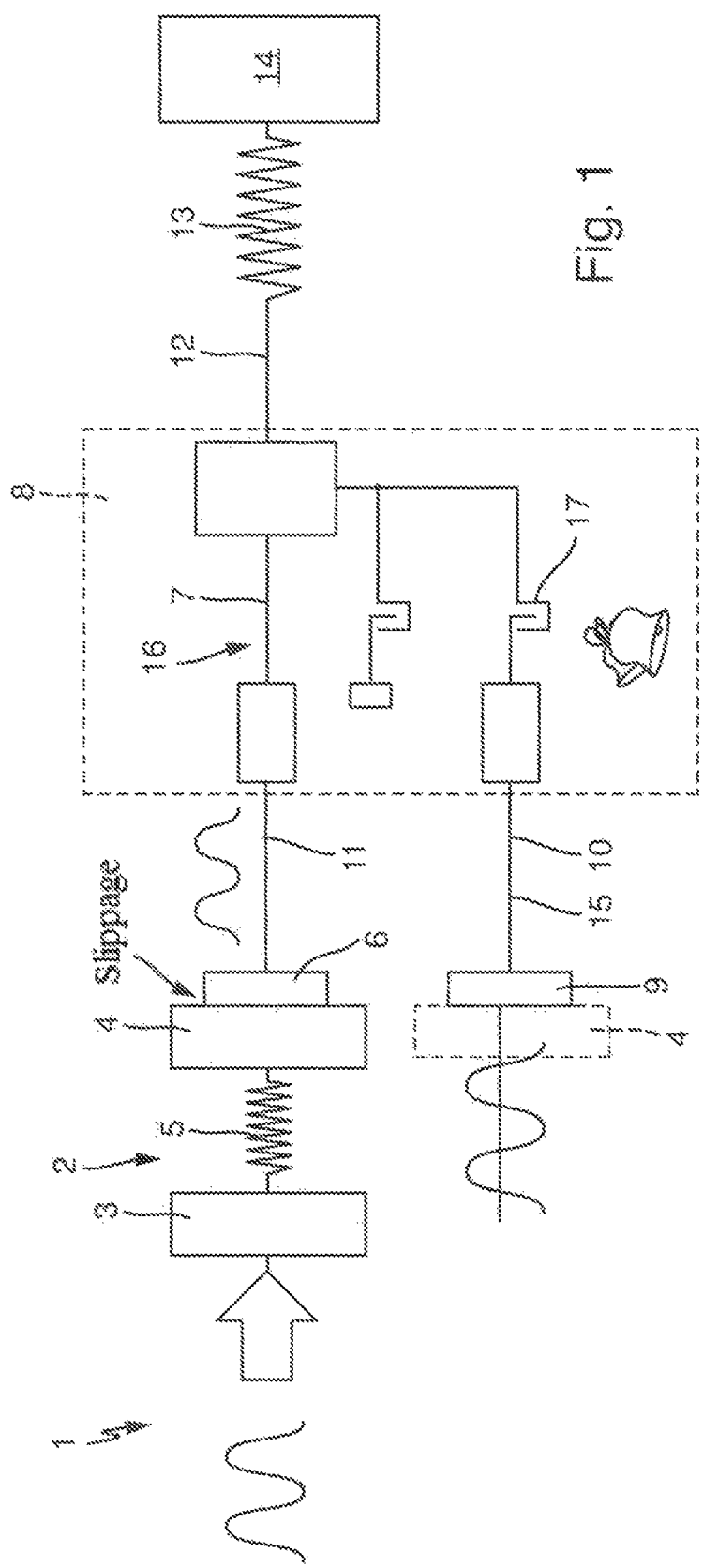
FIG. 1 is a schematic depiction of a transmission in the drivetrain to explain the invention.

Also provided is clutch 9 having a second plate and a second damper in transmission line 10 of transmission 8. Clutches 6 and 9 can each be engaged in order to be able to transmit a torque between input shaft 11 and output shaft 12 of the transmission. In this case, clutches 6, 9 are engaged alternatively to each other so as to transmit a torque either via transmission line 7 or via transmission line 10. When changing the transmission ratio, a change is preferably made from one transmission line to the other. In this case, the transmission ratio to be selected can already be selected in the transmission line, so that the clutch of that transmission line is merely engaged, while the clutch of the other transmission line is disengaged.

Drivetrain 13 extends downline from output shaft 12 of transmission 8 to driven wheels 14. Transmission input shaft 15 of transmission line 10 is likewise connectible to drive motor 1 through secondary inertial mass 4 by means of clutch 9. Secondary inertial mass 4 is shown by dotted lines when it is discussed in conjunction with clutch 9.

In the case where clutch 6 is engaged and torque is transmitted from drive motor 1 via transmission 8 to driven wheels 14, transmission ratio 16 is selected in the transmission. For example, in a dual-clutch transmission having at least two transmission lines 7, 10, no transmission ratio has to be selected in the non-active transmission line, in this case transmission line 10.

Each of clutches 6, 9 are depicted, in terms of vibration, merely as a clutch plate. A clutch pressure plate and counter-pressure plate of course also belong to each of the clutches.

Since the vibrations are greater in particular in internal combustion engines having a small number of cylinders, for example three-cylinder engines, it is possible that at low engine speeds the angle of oscillation of the two inertial masses may become very large, resulting in torsional vibrations being transmitted to the transmission.

This can cause rattling sounds to develop under critical operating conditions, because form-locked connecting elements 17 can be subject to free play, so that form-locked connecting elements 17 may move within the limits of their free play, and elements of the positive connection may strike each other and, in so doing, produce the noises. Corresponding rattling sounds may also occur with loosely positioned gear wheels of transmission 8 and in their positive connections.

Clutch 6, which belongs to selected and active transmission line 7, is engaged with at least partial slippage, so that clutch 6 of transmission line 7 is operated with slippage due to temporary and partial application of clutch 6, so that the mass of the active input shaft and of the active transmission path is reduced.

The impact torques that operate between the active and the inactive transmission line are reduced due to the slippage of the clutch 6.

In vehicle tests using a three-cylinder engine, even the input shaft acceleration increases with slippage due to the coupling to the engine block vibration. So the slip regulation results not only in isolation, but reduces the mass of the shaft of transmission line 7.

Figure 2:
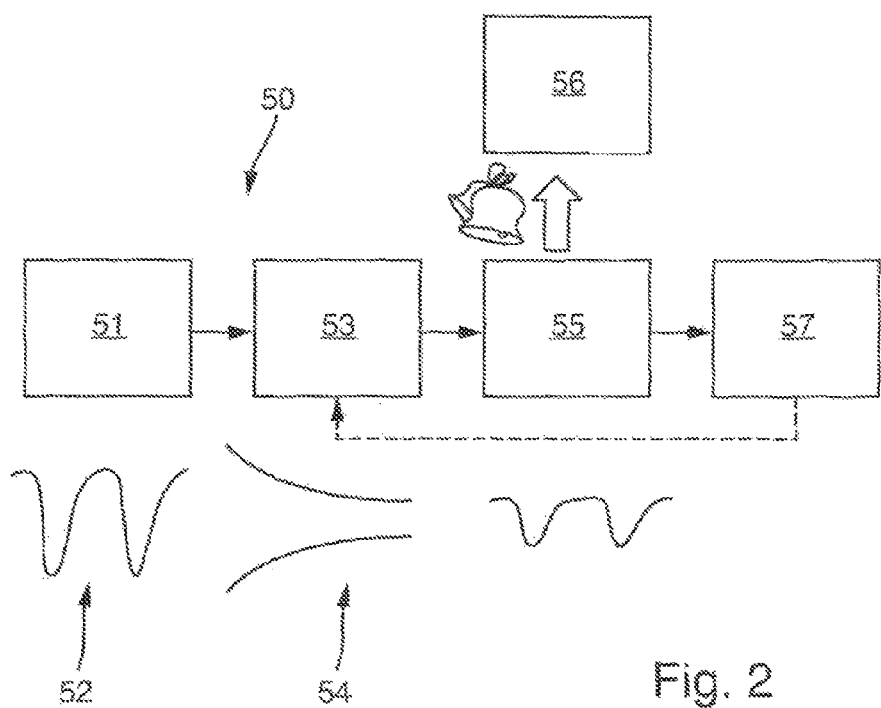
FIG. 2 is a block diagram to explain the invention.

FIG. 2 is a block diagram to explain the invention. FIG. 2 shows block diagram 50. Starting from engine 51 with excitations 52 of the engine torque, engine 51 is connected by means of clutch 53 to transmission 55, while clutch 53 also carries out a reduction of the excitations due to slippage 54. The slippage results in a reduction of the amplitude of the excitation, and the rattling of vehicle parts 56 is reduced. The rattling in drivetrain 57 is likewise reduced.

Figure 3:
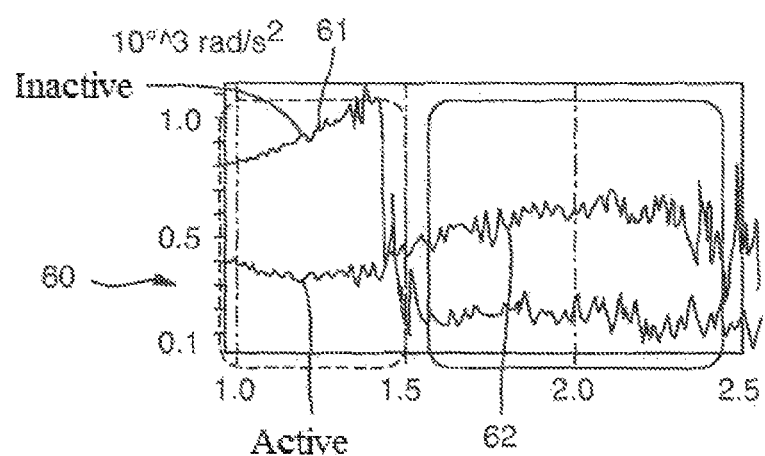
FIG. 3 is a diagram to explain the invention.

FIG. 3 is a diagram to explain the invention. FIG. 3 contains diagram 60 with the amplitude of the torsional vibrations plotted as a function of the speed of rotation. At the beginning, amplitude 61 of the inactive transmission line rises, until it drops severely at around 1,400 rpm and remains at a low level. When clutch 6 is operated with slippage, the amplitude of the inactive transmission line is reduced. In this case, amplitude 62 of active transmission line 7 is significantly smaller than the amplitude of inactive transmission line 10. After the drop in the amplitude of inactive transmission line 10, the amplitude of active transmission line 7 is at a higher level in comparison.

REFERENCE LABELS 1 drive motor
2 dual-mass flywheel
3 inertial mass
4 inertial mass
5 torsional vibration damper
6 first clutch
7 first transmission line
8 transmission
9 second clutch
10 second transmission line
11 input shaft
12 output shaft
13 remaining drivetrain
14 wheel
15 second transmission input shaft
16 transmission ratio
17 connecting element
50 block diagram
51 engine
52 excitations
53 clutch 54 slippage
55 transmission
56 vehicle parts
57 drivetrain
60 diagram
61 amplitude
62 amplitude

The invention claimed is:

1. A method for controlling a transmission to reduce or suppress vibrations of transmission elements or rattling sounds in dual-clutch transmissions having an engine, a first transmission line with a first clutch, and a second transmission line with a second clutch, comprising:
    selecting the first transmission line to transmit torque through;
    assigning a plurality of transmission ratios to the first and second transmission lines so that torque is transmissible between an input shaft and an output shaft of the transmission via the first transmission line with a first transmission ratio selected;
    operating the first clutch with slippage in a predetermined operating situation to transmit torque; and,
    operating the second clutch for a limited time with slippage only in critical operating situations of the transmission.

2. The method according to claim 1, wherein, the predetermined operating situation is an operating situation at engine speeds of the engine lower than 1,800 rpm.

3. The method according to claim 1, wherein, the predetermined operating situation is an operating situation at engine speeds of the engine lower than 1,500 rpm.

4. The method according to claim 1, wherein, the predetermined operating situation is an operating situation at engine speeds of the engine lower than 1,300 rpm.

5. The method according to claim 1, further comprising:
    engaging the second clutch, at least for a limited time, such that the second clutch is operated with slippage.

6. The method according to claim 1, further comprising:
    detecting a predetermined operating system so that the first and second clutches are actuated with slippage to reduce vibration or to reduce rattling sounds.

7. The method according to claim 1, further comprising:
    detecting a predetermined operating system so that the first clutch or the second clutch is actuated with slippage to reduce vibration or to reduce rattling sounds.

8. The method according to claim 7, further comprising:
    actuating the first clutch with slippage; and,
    ending the slipping actuation of the first clutch when the predetermined operating situation is not present.

9. The method according to claim 7, further comprising:
    actuating the first clutch with slippage; and,
    preventing the slipping actuation of the first clutch when the predetermined operating situation is not present.

10. The method according to claim 7, further comprising:
    actuating the second clutch with slippage; and,
    ending the slipping actuation of the second clutch when the predetermined operating situation is not present.

11. The method according to claim 7, further comprising:
    actuating the second clutch with slippage; and,
    preventing the slipping actuation of the second clutch when the predetermined operating situation is not present.

12. The method according to claim 1, further comprising:
    detecting a future predetermined operating situation; and,
    actuating the first clutch with slippage before vibrations from the future predetermined operating situation have developed.

13. The method according to claim 1, wherein operating the first clutch with slippage includes slipping the first clutch in a range from about 10 to 100 revolutions per minute (rpm).

14. The method according to claim 1, wherein operating the first clutch with slippage includes slipping the first clutch between 25 and 50 revolutions per minute.

15. The method according to claim 1, further comprising:
    selecting a second transmission ratio in the second transmission line.

\* \* \* \* \*